F. C. Ring,
Dough Kneader,
Nº 48,979.                    Patented July 25, 1865.
Fig: 1.
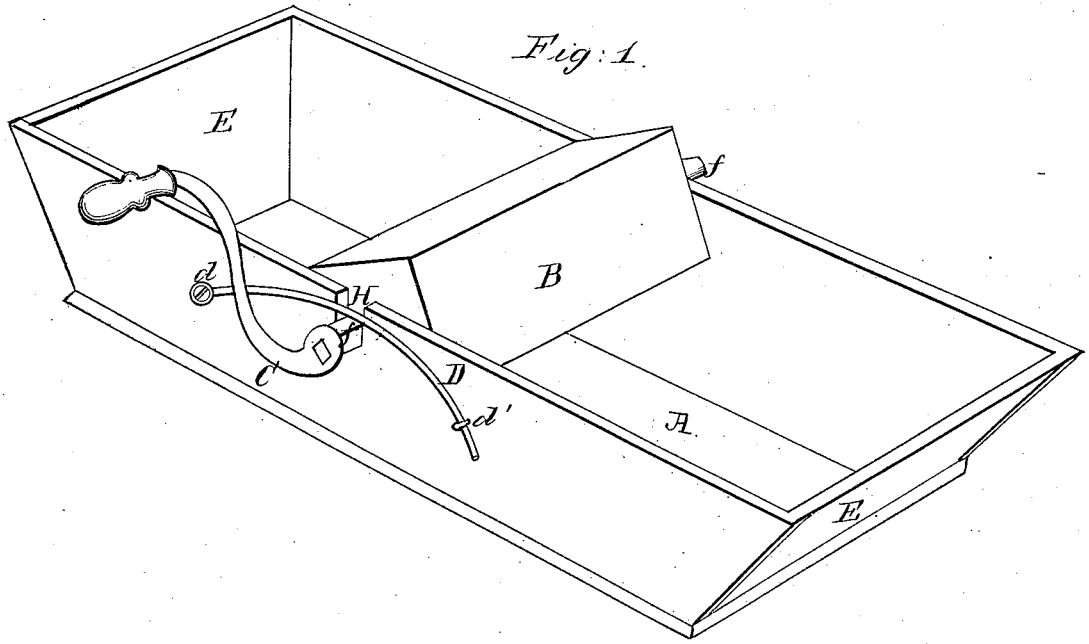
Fig: 2.
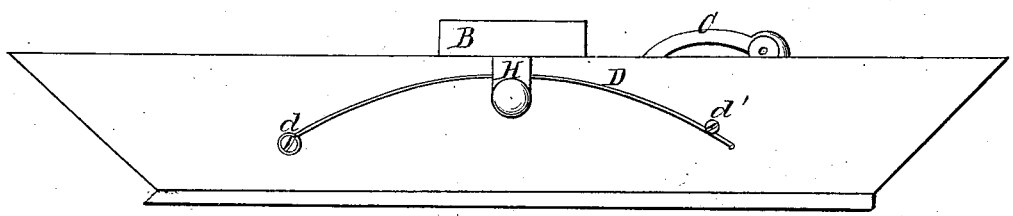
Witnesses;
A. Ring
Frederick A. Ring.
Inventor;
Francis C. Ring.

UNITED STATES PATENT OFFICE.

FRANCIS C. RING, OF PORTLAND, MAINE.

DOUGH-KNEADER.

Specification forming part of Letters Patent No. 48,979, dated July 25, 1865.

*To all whom it may concern:*

Be it known that I, FRANCIS C. RING, of Portland, in the county of Cumberland and State of Maine, have invented a new and useful Machine for Kneading Dough; and I do hereby declare that the following is a full, clear, and exact description of the construction and operation of the same, reference being had to the annexed drawings, making a part of this specification, in which—

Figure 1 is a perspective view; Fig. 2, a longitudinal elevation.

A is inside of bottom of kneading-trough; B, revolving kneader; C, crank to revolve kneader; D, spring; $d$, screw or rivet to confine the spring to the trough; $d'$, screw or rivet under which the loose end of the spring is put after passing over the shaft of revolving kneader; E E, ends of trough; $ff$, axis of revolving kneader; H, bearing for axis of revolving kneader.

These machines may be manufactured of pine or hard-wood lumber. For bottom A, take an inch board twenty-four inches long, twelve inches wide. For sides, take an inch board cut thirty inches long at top, twenty inches at bottom, sides about four inches high, placed on the bottom A upright, the ends E E set in slanting at an angle of about forty-five degrees with the bottom.

The revolving kneader B is made about four inches square, the axes $ff$ or journals of the revolving kneader turned one inch and one-half in diameter.

The crank C can be made of iron or wood, about seven inches from axis to handle. The ends of the bottom A project about two inches beyond the ends of the trough, for convenience of securing the kneading-machine to the table by the use of thumb-screws or otherwise. The revolving kneader B is placed in the bearings H, so that in its revolutions there will be about from one-quarter to one-half inch between the lowest corner of the kneader B and bottom A.

The springs D may be made of steel, iron, or wood, and of sufficient stiffness to prevent the revolving kneader B from riding over the dough, instead of breaking it down and drawing it under.

The operation of the kneading-machine is as follows: The ingredients for bread having been mixed in the trough to the consistency of dough, the revolving kneader B is placed in bearings H, springs D brought over the shaft $ff$ and sprung down under screw $d'$, sufficient flour having been sprinkled to prevent the dough sticking to the revolving kneader or bottom of trough. Then by use of crank C the revolving kneader B is turned, and as each corner falls upon the dough it presses it against the bottom of the trough until the corner gets nearest to the bottom of the trough. It then pulls the dough under the revolving kneader B while the following corner is pressing a portion of the dough against the bottom of the trough, thus each corner alternately pressing and pulling until the batch of dough has all passed under the revolving kneader into one end of the trough. Then by reversing the crank motion the dough is pressed, pulled, and forced into the other end of the trough, and thus back and forth until sufficiently kneaded, kneading the dough more perfectly and with far less labor and in less time than can be done by hand.

I am aware that corrugated rollers have been used, in combination with the bread trough or tray, for kneading dough. These I do not claim; but, Having described my invention, what I claim as new, and desire to secure by Letters Patent, is—

The employment and use of revolving kneader B with trough, in combination with springs D and spring-fastenings $d$ and $d'$, substantially as and for the purpose set forth.

FRANCIS C. RING.

Witnesses:
 A. RING,
 FREDERICK A. RING.